(12) United States Patent
Sadhu et al.

(10) Patent No.: US 11,269,336 B2
(45) Date of Patent: Mar. 8, 2022

(54) METHOD AND SYSTEM FOR FREE SPACE DETECTION IN A CLUTTERED ENVIRONMENT

(71) Applicant: Tata Consultancy Services Limited, Mumbai (IN)

(72) Inventors: Arup Kumar Sadhu, Kolkata (IN); Ranjan Dasgupta, Kolkata (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 412 days.

(21) Appl. No.: 16/578,255

(22) Filed: Sep. 20, 2019

(65) Prior Publication Data

US 2020/0097013 A1 Mar. 26, 2020

(30) Foreign Application Priority Data

Sep. 21, 2018 (IN) .............................. 201821035691

(51) Int. Cl.
*G06T 7/64* (2017.01)
*G05D 1/02* (2020.01)
(Continued)

(52) U.S. Cl.
CPC ......... *G05D 1/0214* (2013.01); *G05D 1/0088* (2013.01); *G05D 1/0291* (2013.01);
(Continued)

(58) Field of Classification Search
None
See application file for complete search history.

(56) References Cited

U.S. PATENT DOCUMENTS 8,515,612 B2 * 8/2013 Tanaka ................. G05D 1/0217
701/25
2001/0023390 A1 * 9/2001 Gia ....................... G01S 13/935
701/301

(Continued)

OTHER PUBLICATIONS

Deits, R. et al. "Computing Large Convex Regions of Obstacle-Free Space through Semidefinite Programming," *Algorithmic Foundations of Robotics XI*, Apr. 30, 2015, pp. 109-124.

*Primary Examiner* — James M McPherson
(74) *Attorney, Agent, or Firm* — Finnegan, Henderson, Farabow, Garrett & Dunner LLP

(57) ABSTRACT

Robots are used extensively in different applications so as to perform specific tasks. However, the robots are required to move around in a location where they are present, so as to perform the tasks. For path planning, free space identification is performed by the robots during which obstacles are detected and free space is identified. However, the existing systems for path planning struggle to identify free space in cluttered environments. The disclosure herein generally relates to robotic path planning, and, more particularly, to a method and system for free space detection in a cluttered environment for robotic path planning. The system inscribes obstacles in bounding boxes and all unit grids inscribed by the bounding boxes are considered as occupied. Further, by seeding the occupancy grid map, the system identifies unified segments and corresponding seeds. Further a convex expansion is executed in the occupancy grid map to detect the free space.

9 Claims, 7 Drawing Sheets

(51) Int. Cl.
*G06T 7/11* (2017.01)
*G05D 1/00* (2006.01)

(52) U.S. Cl.
CPC ............... *G06T 7/11* (2017.01); *G06T 7/64* (2017.01); *G05D 2201/0213* (2013.01); *G06T 2210/12* (2013.01)

(56) References Cited

U.S. PATENT DOCUMENTS

| | | | |
|---|---|---|---|
| 2008/0294338 A1* | 11/2008 | Doh | G05D 1/0234 |
| | | | 701/533 |
| 2014/0025203 A1* | 1/2014 | Inazumi | B25J 9/1666 |
| | | | 700/255 |
| 2016/0070265 A1 | 3/2016 | Liu et al. | |
| 2018/0079085 A1* | 3/2018 | Nakata | G05D 1/024 |
| 2018/0149753 A1* | 5/2018 | Shin | G01S 17/42 |
| 2019/0317520 A1* | 10/2019 | Zhang | B60W 50/0098 |
| 2019/0332114 A1* | 10/2019 | Moroniti | G05D 1/0246 |
| 2020/0198140 A1* | 6/2020 | Dupuis | G06F 17/18 |
| 2020/0271749 A1* | 8/2020 | Wu | G01C 21/188 |

\* cited by examiner

METHOD AND SYSTEM FOR FREE SPACE DETECTION IN A CLUTTERED ENVIRONMENT

PRIORITY CLAIM

This U.S. patent application claims priority under 35 U.S.C. § 119 to Indian Application No. 201821035691, filed on Sep. 21, 2018. The entire contents of the aforementioned application are incorporated herein by reference.

TECHNICAL FIELD

This disclosure relates generally to robotic path planning, and more particularly to a method and system for free space detection in a cluttered environment for robotic path planning.

BACKGROUND

With advancement in technology, specifically in robotics and automation domains, sophisticated robots are built which are capable of handling different functions/applications. With industrial automation, such robots are replacing manpower. A few examples of domains in which robots are deployed are warehouse management, military operations, change detection, and so on. When robots are deployed for specific applications, traditionally the robots had to be controlled by operators, due to necessity of dynamic decision making to execute certain processes/actions. However, developments in Artificial Intelligence (AI) have given decision making powers to the robots.

One such decision making requirement is in terms of path planning. When robots are deployed in an environment, they may have to move around to perform actions associated with tasks assigned to them. In order to move around, the robots need to perform path planning, during which the robots identify one or more paths (between own location (source) to a destination). The path planning is comparatively easy in an open space which is less congested. However, the path planning becomes difficult in a cluttered environment. This is primarily because in a cluttered environment available free space for robotic movement is less as compared to that in a less cluttered environment.

The inventors here have recognized several technical problems with such conventional systems, as explained below. Existing systems for robotic path planning use different approaches for free space identification. For example, most of them use an occupancy grid map to represent an environment in which the robot is present, and locations of objects/obstacles present in that environment are marked in the occupancy grid map. In the occupancy grid map, the area/environment is split into multiple unit geometric grids. The existing systems for path planning mark only those unit geometric grids in which vertices of the object are present, as occupied, even though the object/obstacle may be completely covering one or more other unit geometric grids (as vertices may not be present in such unit geometric grids), thus producing incorrect data. Another disadvantage of the existing systems is that even though area covered by a unit geometric grid is only partially occupied by an object/obstacle, these systems, by marking such unit geometric grids as occupied, tend to ignore such free space which could have been utilized for robotic movement.

SUMMARY

Embodiments of the present disclosure present technological improvements as solutions to one or more of the above-mentioned technical problems recognized by the inventors in conventional systems. For example, in one embodiment, a processor-implemented method for free space detection for robotic movement is provided. Initially, via one or more hardware processors, sensor data pertaining to location of at least one obstacle in an area being scanned by a robot is fetched. Further, an occupancy grid map of the area is generated based on the sensor data, via the one or more hardware processors, wherein the at least one obstacle is inscribed in a bounding box in the occupancy grid map. Further, all unit geometric grids of the occupancy grid map which are fully or partially inscribed in the bounding box are marked as occupied via the one or more hardware processors. Then the occupancy grid map seeded via the one or more hardware processors, wherein seeding the occupancy grid map involves: generating a plurality of unified segments, wherein each of the plurality of unified segments is generated by merging the unit geometric grids which are out of the at least one bounding box; identifying center of each of the plurality of unified segments; and marking the identified center of each of the plurality of unified segments as a seed of the corresponding unified segment. Further, the free space is identified by executing a convex expansion in the occupancy grid map, via the one or more hardware processors. The convex expansion involves: creating a convex region around each seed; iteratively expanding the convex region within the corresponding unified segment, in all directions, till the edges of the convex region touch either an edge of the unified segment or an edge of the obstacle; and identifying area covered by all the convex regions in the occupancy grid map as the free space.

In another embodiment, a system is provided. The system includes a memory module storing a plurality of instructions; one or more communication interfaces; and one or more hardware processors coupled to the memory module via the one or more communication interfaces. The one or more hardware processors are caused by the plurality of instructions to fetch sensor data pertaining to location of at least one obstacle in an area being scanned by a robot. Further, an occupancy grid map of the area is generated based on the sensor data, wherein the at least one obstacle is inscribed in a bounding box in the occupancy grid map. Further, all unit geometric grids of the occupancy grid map which are fully or partially inscribed in the bounding box are marked as occupied. Then the occupancy grid map seeded, wherein seeding the occupancy grid map involves: generating a plurality of unified segments, wherein each of the plurality of unified segments is generated by merging the unit geometric grids which are out of the at least one bounding box; identifying center of each of the plurality of unified segments; and marking the identified center of each of the plurality of unified segments as a seed of the corresponding unified segment. Further, the free space is identified by executing a convex expansion in the occupancy grid map. The convex expansion involves: creating a convex region around each seed; iteratively expanding the convex region within the corresponding unified segment, in all directions, till the edges of the convex region touch either an edge of the unified segment or an edge of the obstacle; and identifying area covered by all the convex regions in the occupancy grid map as the free space.

In yet another aspect, a non-transitory computer readable medium for free space detection for robotic movement is provided is provided. The non-transitory computer readable medium performs the free space detection by executing the following steps. Initially, sensor data pertaining to location of at least one obstacle in an area being scanned by a robot is fetched. Further, an occupancy grid map of the area is generated based on the sensor data, wherein the at least one obstacle is inscribed in a bounding box in the occupancy grid map. Further, all unit geometric grids of the occupancy grid map which are fully or partially inscribed in the bounding box are marked as occupied. Then the occupancy grid map seeded, wherein seeding the occupancy grid map involves: generating a plurality of unified segments, wherein each of the plurality of unified segments is generated by merging the unit geometric grids which are out of the at least one bounding box; identifying center of each of the plurality of unified segments; and marking the identified center of each of the plurality of unified segments as a seed of the corresponding unified segment. Further, the free space is identified by executing a convex expansion in the occupancy grid map. The convex expansion involves: creating a convex region around each seed; iteratively expanding the convex region within the corresponding unified segment, in all directions, till the edges of the convex region touch either an edge of the unified segment or an edge of the obstacle; and identifying area covered by all the convex regions in the occupancy grid map as the free space.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
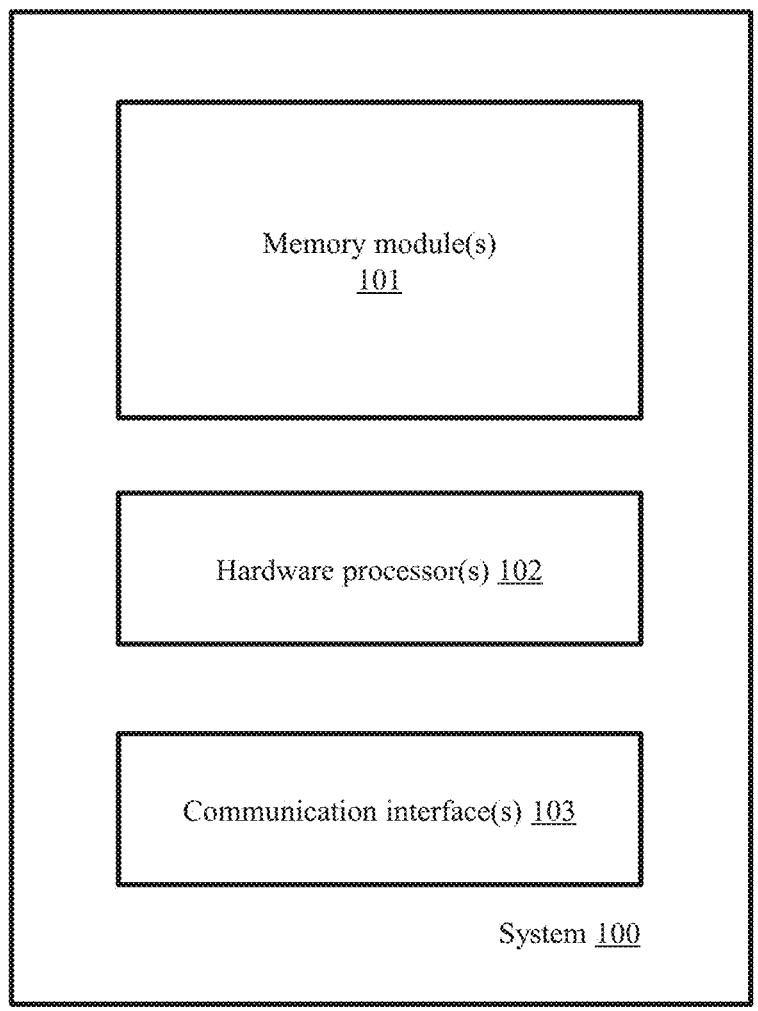
FIG. 1 illustrates an exemplary system for free space detection, according to some embodiments of the present disclosure.

FIG. 1 illustrates an exemplary system for free space detection, according to some embodiments of the present disclosure. The system 100 includes one or more memory modules 101, one or more hardware processors 102, and one or more communication interfaces 103.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module (s) 101 are further configured to store a plurality of instructions, which when executed, cause the one or more hardware processor(s) 102 to perform different actions associated with the free space identification being handled by the system 100. The memory module(s) 101 can be further configured to store any data (such as input sensor data, any intermediate output (such as the generated occupancy grid map, seed information and so on), and output (i.e. data pertaining to the free space identified), associated with the free space detection being handled by the system 100.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 102 are configured to perform data and control signal processing, at different stages of the free space detection, as required.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) can be configured to provide one or more channels with appropriate protocols, for the system 100 to communicate with one or more external systems. For example, the communication interface(s) 103 interacts and collects inputs required for the free space detection, from one or more sensors, wherein the sensors may or may not be part of the system 100. The communication interface(s) 103 may further provide appropriate user interface(s) for an authorized user to interact with the system 100. The communication interface(s) 103 can be further configured to provide one or more channels for different components of the system 100 to interact with each other and perform data and/or control transfer.

The system 100 can be implemented in different ways. In one mode of implementation, the system 100 acts as a stand-alone system that may be hosted on a cloud and/or as part of a network, such that the system 100 interacts with one or more robots, collects and processes the sensor data to identify free space in the environments in which the one or more robots are present/located. In another mode of implementation, the system 100 can be a dedicated component attached to a robot, which performs the free space identification for that robot.

Figure 5A:
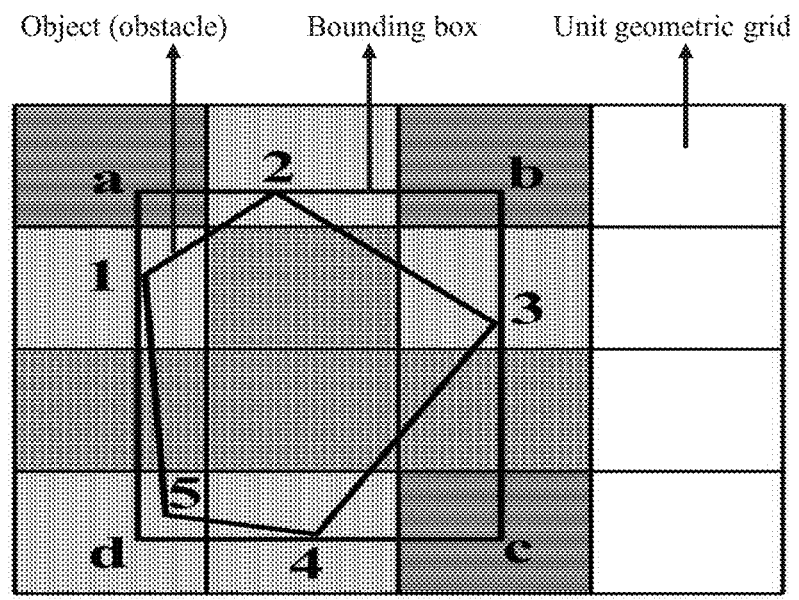
FIGS. 5A, 5B, 5C, 5D, and 5E are example diagrams depicting different steps involved in the process of identifying the free space by the system of FIG. 1, according to some embodiments of the present disclosure.

The system 100 processes the sensor data from a robot, which is collected as input, and generates an occupancy grid map for the environment (area) being scanned by the robot. In the occupancy grid map, the area being scanned is split to multiple unit geometric grids. One or more physical objects/objects (also referred to as 'obstacles', as the objects act as obstacles while the robot is moving around) may be present in the area being scanned by the robot. While planning a route for the robot to move around, the route is planned such that the robot can avoid collision with these obstacles. While generating the occupancy grid map, the system 100 puts a bounding box each, around each object, such that the object is fully inscribed in the bounding box (as depicted in FIG. 5A). Further, depends on the size of the object and the size of the unit geometric grids, each object may be covering one or more unit geometric grids, partially or completely. The system 100 identifies all the unit geometric grids inscribed in the bounding box, as occupied. The system 100 can be configured to generate a 2-dimensional occupancy grid map and/or a 3-dimensional grid map. Consider the following equations associated with the occupancy grid map generation:

$$c_{o,v} = [c_1^{o,v}, c_2^{o,v}, \ldots c_N^{o,v}], v \in [1, V] \quad (1)$$

$$n_o^{min} = \min_{\mathcal{X}_v} [c_n^{o,v}], v \in [1, V], n \in [1, N] \quad (2)$$

$$n_o^{max} = \max_{\mathcal{X}_v} [c_n^{o,v}], v \in [1, V], n \in [1, N] \quad (3)$$

Generalized form of vertex coordinate in the occupancy grid map is given in equation (1), where $c_n^{o,v}$ is $v^{th}$ vertex along $n^{th}$ coordinate axis of $o^{th}$ obstacle. In equations (2) and (3), $n_o^{min}$ and $n_o^{max}$ return minimum and maximum coordinate values respectively, along $n^{th}$ coordinate axis of $o^{th}$ obstacle. Subsequently, employing $n_o^{min}$, $\mathcal{X}_n$ and $n_o^{max}$, $\mathcal{X}_n$ for an N-dimensional bounding box, $B_{o,N}$ is created inscribing the N dimensional obstacle, o. All the unit geometric grids that are partially or fully inscribed by $B_{o,N}$ are considered as occupied grids by the obstacle o.

After generating the occupancy grid map, the system 100 then seeds the occupancy grid map. At this stage, the system 100 analyzes the occupancy grid map and collects data pertaining to unoccupied (free) unit geometric grids i.e. the unit geometric grids which are outside the one or more bounding boxes in the occupancy grid map. The system 100 generates the unified segments by merging multiple free unit geometric grids. Further, the system 100 identifies centroid of each unified segment. Further, the identified centroid of each unified segment is marked as seed (or seed point) of the corresponding unified segment (as depicted in FIG. 5C). Consider the following equations which are associated with the occupancy grid map seeding:

$$\{US\} \leftarrow U_{l=1}^{L} US(l) \quad (4)$$

$$US(I) \leftarrow \{US^{min}(I); US^{max}(I)\}, \quad (5)$$

$$US^{min}(I) \leftarrow \{\rho_1^{min}, \rho_2^{min}, \ldots \rho_N^{min}\} \quad (6)$$

$$US^{max}(I) \leftarrow \{\rho_1^{max}, \rho_2^{max}, \ldots \rho_N^{max}\} \quad (7)$$

Here, equation (5) defines an $I^{th}$ unified segment which is a union of free geometric grids. In order to generate the unified segments, the system 100 considers all free unit geometric grids in any one direction. For example, starting from a free unit geometric grid from left most corner in a row, all other free unit geometric grids in the same row are considered, and they together form a unified segment. Equations (6) and (7) denote $U S^{min}$ (I) and $U S^{max}$ (I) which represent collection of minimum position vector $\rho_n^{min}$ (starting vertex) and maximum position vector $\rho_n^{max}$ (ending vertex) respectively, of the $I^{th}$ segment, $\rho_i \in R^N$. Equation (4) represents a set of unified segments $\{U S\}$, where $I \in [1, L]$, and L being total number of free segments. Union of all the unified segments in the occupancy grid map represents N-dimensional obstacle free region to be seeded. The centroid of each such region is computed and is treated as seed, $S \in R^N$. $\{s\}$ denotes a set of seeds.

After seeding and identifying the set of seeds $\{s\}$, the system executes a convex expansion on the occupancy grid map. At this step, the system 100 creates a convex region around each seed i.e. within each unified segment, a convex region is present. Then the system 100 iteratively expands the convex regions in each unified segment, simultaneously or one by one. The convex region in a unified segment is expanded such that the convex expansion is terminated when each edge of the convex region touches edge of the unified segment in which it is present or edge of at least one obstacle. After expanding all convex regions in all unified segments of the occupancy grid map (as depicted in FIG. 5E), the area covered by the convex regions represent free space in which the area covered in the occupancy grid map, which may be further used for robotic path planning to identify at least one path for the robot to move around. The robotic path planning using the free space information may or may not be performed by the system 100.

Figure 2:
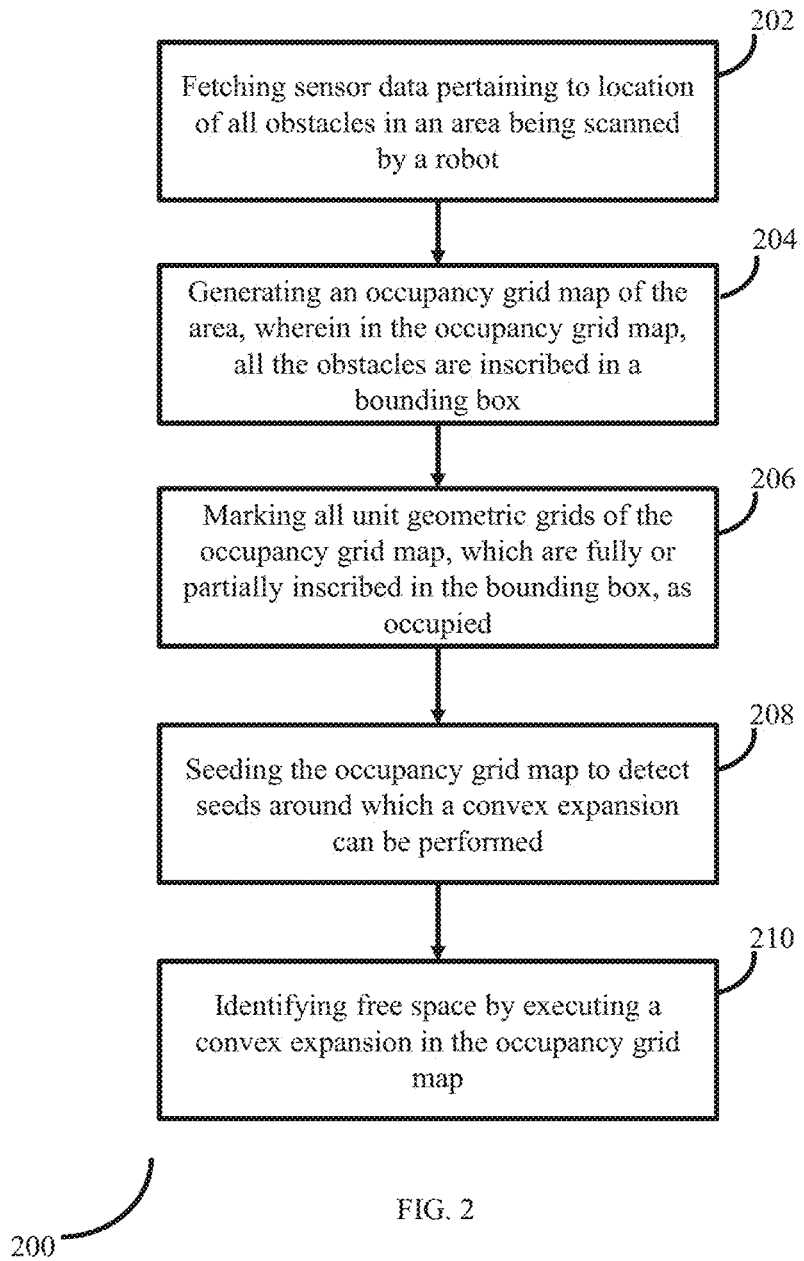
FIG. 2 is a flow diagram depicting steps involved in the process of detecting free space, using the system of FIG. 1, according to some embodiments of the present disclosure.

FIG. 2 is a flow diagram depicting steps involved in the process of detecting free space, using the system of FIG. 1, according to some embodiments of the present disclosure. Initially, sensor data pertaining at least to location of all objects/obstacles in an area being scanned by a robot is fetched (202) as input by the system 100. Further, using at least the sensor data collected as input, the system 100 generates (204) the occupancy grid map in which each of the objects are inscribed in dedicated bounding boxes. The system 100 identifies and marks (206) all the unit geometric grids that are partially or fully inscribed in each bounding box as occupied. Further the system 100 seeds (208) the occupancy grid map to identify a set of seeds in the occupancy grid maps, around which a convex expansion can be performed. After identifying the seeds, the system identifies (210) the free space in the occupancy grid map, by executing the convex expansion. In an embodiment, the steps in method 200 may be performed in the same order as depicted in the flow diagram or in any alternate order. In another embodiment, one or more steps in method 200 may be omitted.

Figure 3:
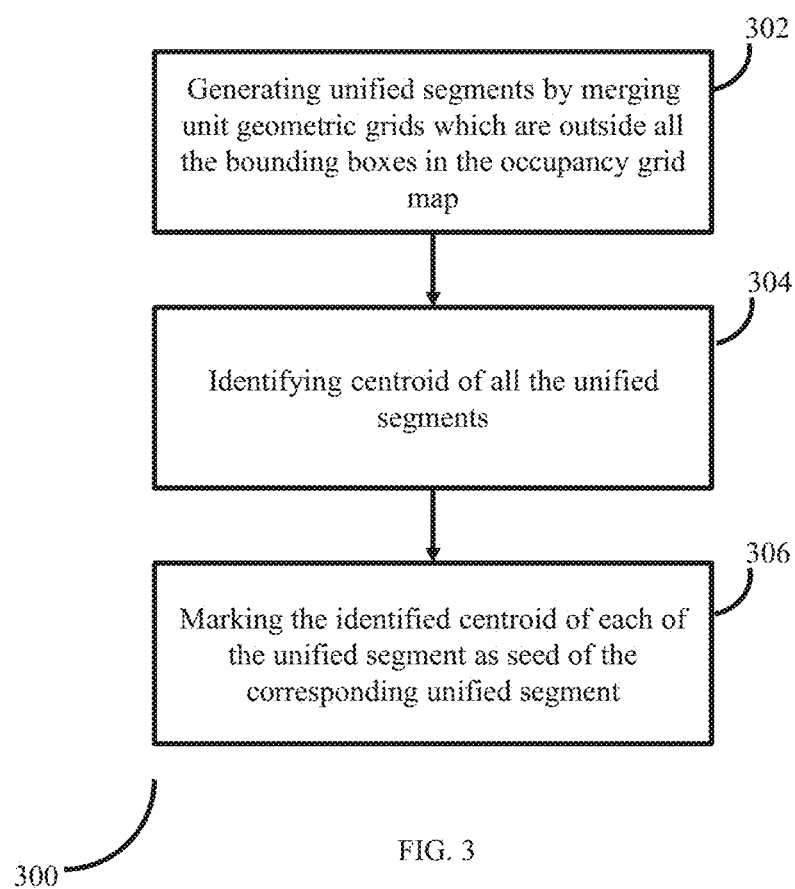
FIG. 3 is a flow diagram depicting steps involved in the process of seeding in an occupancy grid map, using the system of FIG. 1, according to some embodiments of the present disclosure.

FIG. 3 is a flow diagram depicting steps involved in the process of seeding in an occupancy grid map, using the system of FIG. 1, according to some embodiments of the present disclosure. In this process, the system 100 generates one or more unified segments by merging the free unit geometric grids in the occupancy grid map. The free unit geometric grids are the grids in the occupancy grid map, which are not inscribed in any bounding box. This also means that the free unit geometric grids are not occupied by any object/obstacle. After generating the unified segments, the system 100 identifies (304) centroid of each of the unified segments. The system further maps (306) the identified centroid of each of the unified segments as the seed of the unified segment. In an embodiment, the steps in method 300 may be performed in the same order as depicted in the flow diagram or in any alternate order. In another embodiment, one or more steps in method 300 may be omitted.

Figure 4:
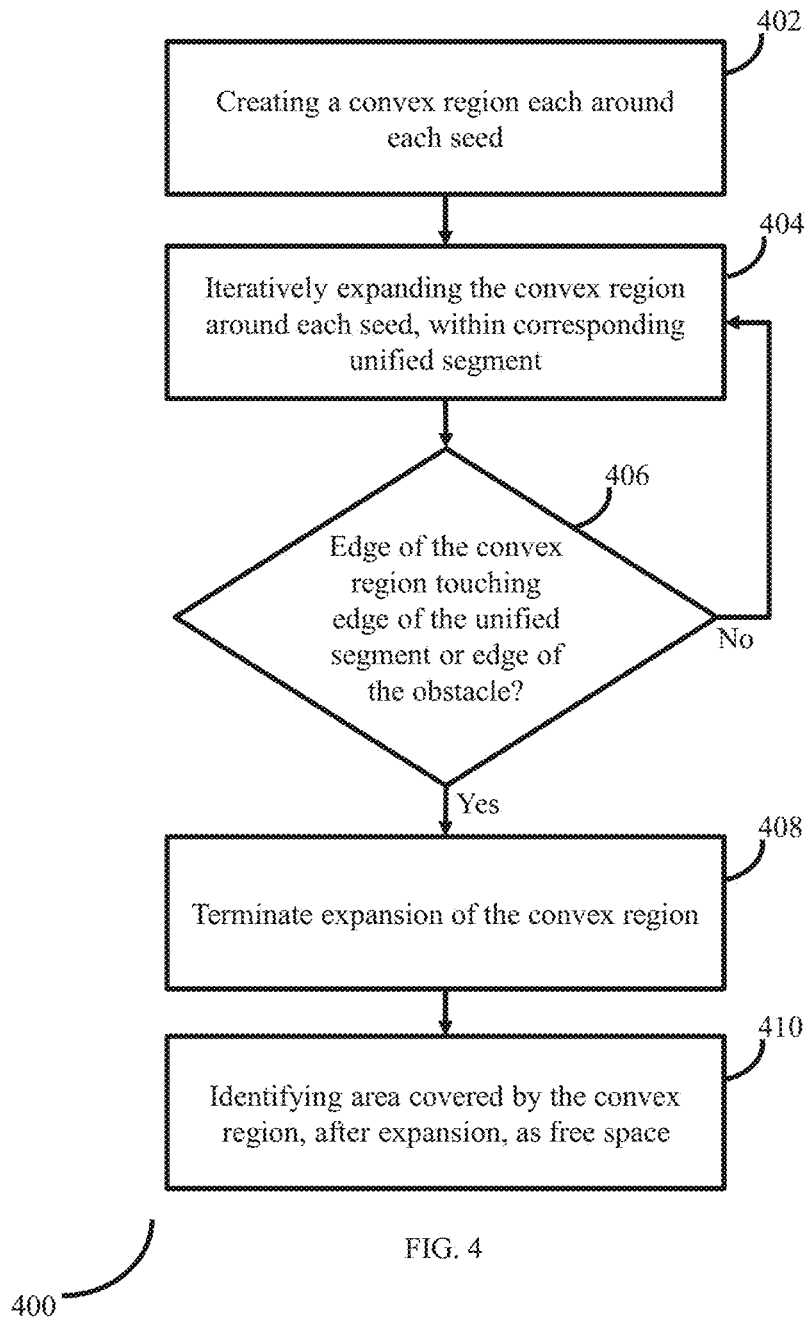
FIG. 4 is a flow diagram depicting steps involved in the process of executing a convex expansion in an occupancy grid map, using the system of FIG. 1, according to some embodiments of the present disclosure.

FIG. 4 is a flow diagram depicting steps involved in the process of executing a convex expansion in an occupancy grid map, using the system of FIG. 1, according to some embodiments of the present disclosure. At this stage, the system 100 creates (402) a convex region each, around each seed. Further, each convex region is iteratively expanded (404), and once the edges of the convex region touches edge of the corresponding unified segment or that of the obstacle(s), the convex expansion is terminated (408). In an embodiment, the convex region is expanded over a bounding box, till the convex region touches edges of the obstacle inscribed in the bounding box. After terminating the convex expansion, the system 100 identifies (410) area covered by the convex region as the free space. In an embodiment, the steps in method 400 may be performed in the same order as depicted in the flow diagram or in any alternate order. In another embodiment, one or more steps in method 400 may be omitted.

FIGS. 5A, 5B, 5C, 5D, and 5E are example diagrams depicting different steps involved in the process of identifying the free space by the system of FIG. 1, according to some embodiments of the present disclosure. Consider FIG. 5A. There are two axes. In FIG. 5A there are two axes. One is horizontal i.e., x-axis. The other one is the vertical axis i.e., y-axis. The entire region is divided into 4×4 grids. The obstacle in FIG. 5A has five vertices. Now with reference to FIG. 5A, (1)-(3) for and assuming left down corner as the origin:

$$x_o^{min} = \min[c_x^{o,1}, c_x^{o,2}, \ldots, c_x^{o,5}] = c_x^{o,1} \quad (8)$$

$$x_o^{max} = \max[c_x^{o,1}, c_x^{o,2}, \ldots, c_x^{o,5}] = c_x^{o,3} \quad (9)$$

$$y_o^{min} = \min[c_y^{o,1}, c_y^{o,2}, \ldots, c_y^{o,5}] = c_y^{o,4} \quad (10)$$

$$y_o^{max} = \max[c_y^{o,1}, c_y^{o,2}, \ldots, c_y^{o,5}] = c_y^{o,2} \quad (10)$$

The coordinate of d in bounding box abcd is $(c_x^{o,1}, c_y^{o,4})$. Coordinate of a in bounding box abcd is $(c_x^{o,1}, c_y^{o,2})$. Similarly, all the corner coordinate of bounding box abcd can be obtained. After obtaining all the coordinates of the bounding box abcd, any grid inscribed by this bounding box is considered as the occupied. Same logic is used by the system 100 to generate occupancy grid map in 3-dimension as well.

Figure 5B:
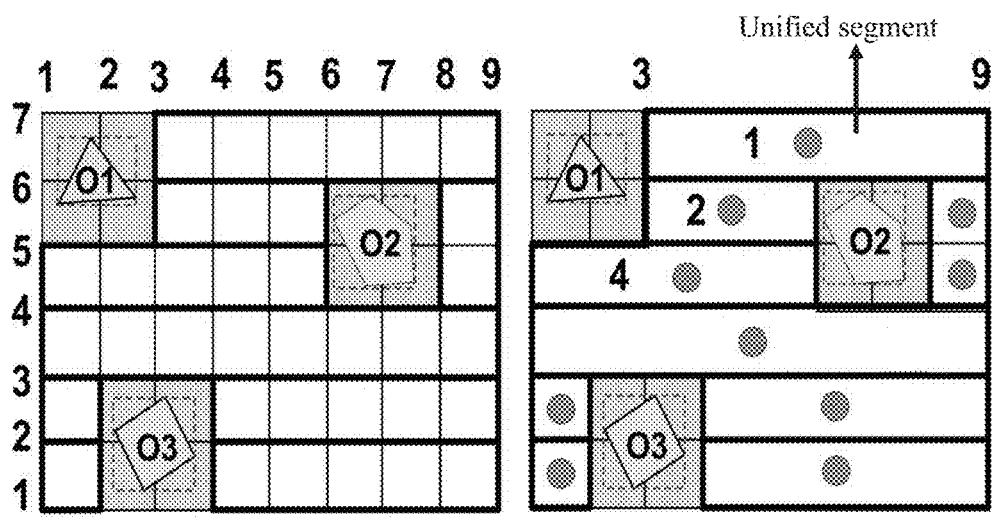
Figure 5C:
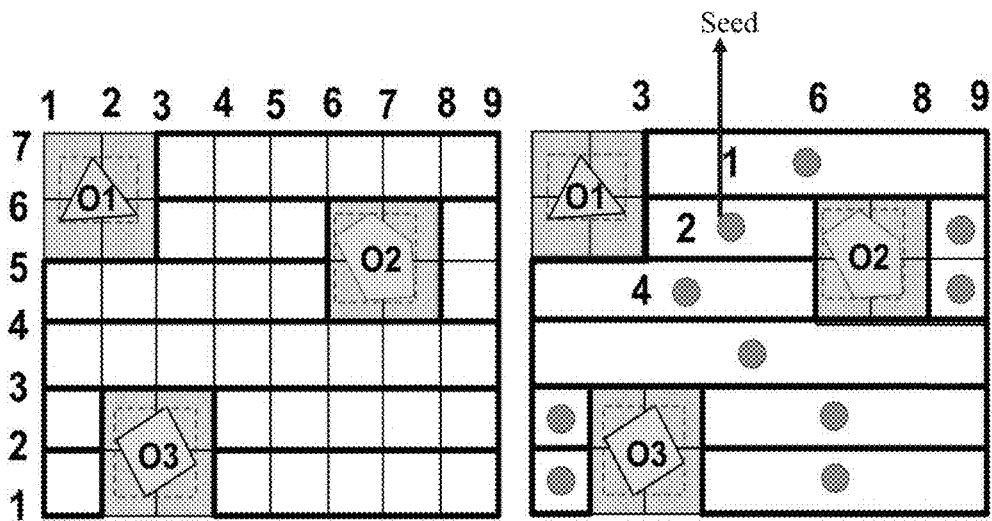
Figure 5D:
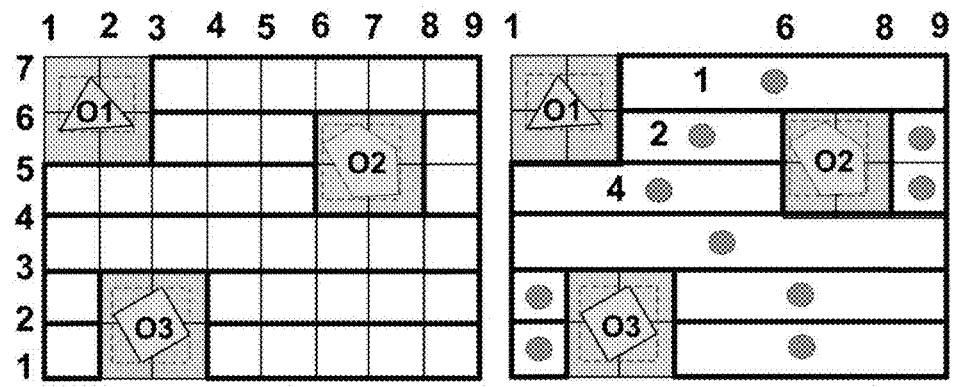
Figure 5E:
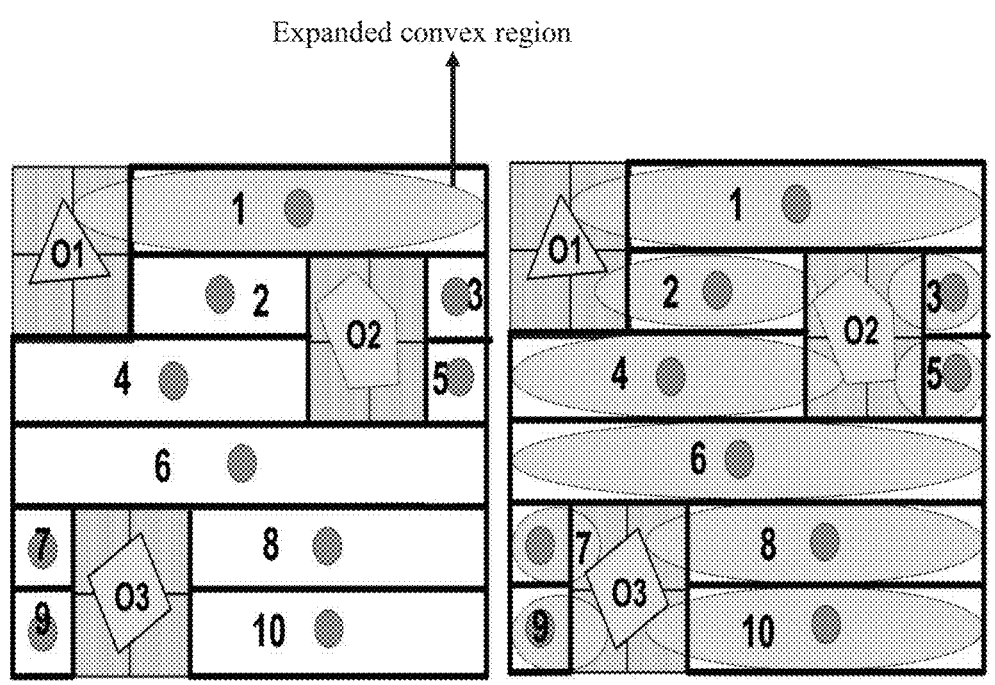

Now consider FIG. 5B through FIG. 5D, which depict the seeding of the occupancy grid map depicted in FIG. 5A, followed by a geometric unification. The geometric unification starts from one corner of the occupancy grid map. Let a be the start point. In FIG. 5B, for the sixth row, first two columns are occupied. In the sixth row columns 3 to 8 are free. At this stage the system 100 checks for existence of free grid along the sixth row and continue until a new obstacle or boundary appears. Based on that free-region is obtained in the left side of FIG. 5B. Now, from FIG. 5B, and equations (4)-(7):

$$US^{min}(1) = \{3,6\} \quad (12)$$

$$US^{max}(1) = \{9,7\} \quad (13)$$

$$US(1) = \{US^{min}(1), US^{max}(1)\} \quad (14)$$

Similarly from FIG. 5C and equations (4)-(7):

$$US^{min}(2) = \{3,5\} \quad (15)$$

$$US^{max}(2) = \{6,6\} \quad (16)$$

$$US(2) = \{US^{min}(2), US^{max}(2)\} \quad (17)$$

In this way, all the unified segments are obtained. After that center of each unified segment is evaluated and is identified as the seed of that region. Further, the system 100 executes the convex expansion around the identified seeds. The convex expansion on an occupancy grid map is iterated based on number of unified segments (or the number of seeds).

$$\{o\} = \{o1, o2, o3\} \quad (18)$$

$$\{vo\} = \{US(2), US(3), \ldots, US(10)\} \quad (19)$$

$$\{to\} = \{o\} \cup \{vo\} \quad (20)$$

After that $\{vo\}$ and $\{to\}$ are set to an empty set. In the second iteration: (A.2) is kept same.

$$\{vo\} = \{US(1), US(3), \ldots, US(10)\} \quad (21)$$

$$\{to\} = \{o\} \cup \{vo\} \quad (22)$$

This is repeated for all the seeds in the occupancy grid map, and finally the free space available is detected as the area covered by all the (expanded) convex regions in the occupancy grid map.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for free space detection for robotic path planning, comprising:
fetching, via one or more hardware processors, sensor data pertaining to location of at least one obstacle in an area being scanned by a robot;
generating an occupancy grid map of the area based on the sensor data, via the one or more hardware processors, wherein the at least one obstacle is inscribed in a bounding box, in the occupancy grid map;
marking, via the one or more hardware processors, all unit geometric grids of the occupancy grid map which are fully or partially inscribed in the bounding box, as occupied;
seeding the occupancy grid map, via the one or more hardware processors, comprising:
generating a plurality of unified segments, wherein each of the plurality of unified segments is generated by merging the unit geometric grids which are out of the at least one bounding box;
identifying center of each of the plurality of unified segments; and
marking the identified center of each of the plurality of unified segments as a seed of the corresponding unified segment; and
identifying the free space by executing a convex expansion in the occupancy grid map, via the one or more hardware processors, comprising:
creating a convex region around each seed;
iteratively expanding the convex region within the corresponding unified segment, in all directions, till the edges of the convex region touch either an edge of the unified segment or an edge of the obstacle; and
identifying area covered by all the convex regions in the occupancy grid map as the free space.

2. The method as claimed in claim 1, wherein the plurality of unified segments represent free regions in the occupancy grid map.

3. The method as claimed in claim 1, wherein while expanding the convex region in a unified segment, other unified segments are marked as virtual obstacles.

4. A system for free space detection for robotic path planning, comprising:
a memory module storing a plurality of instructions;
one or more communication interfaces; and
one or more hardware processors coupled to the memory module via the one or more communication interfaces, wherein the one or more hardware processors are caused by the plurality of instructions to:
fetch sensor data pertaining to location of at least one obstacle in an area being scanned by a robot;
generate an occupancy grid map of the area based on the sensor data, wherein the at least one obstacle is inscribed in a bounding box in the occupancy grid map;
mark all unit geometric grids of the occupancy grid map which are fully or partially inscribed in the bounding box, as occupied;
seed the occupancy grid map, by:
generating a plurality of unified segments, wherein each of the plurality of unified segments is generated by merging the unit geometric grids which are out of the at least one bounding box;
identifying center of each of the plurality of unified segments; and
marking the identified center of each of the plurality of unified segments as a seed of the corresponding unified segment; and
identify the free space by executing a convex expansion in the occupancy grid map, by:
creating a convex region around each seed;
iteratively expanding the convex region within the corresponding unified segment, in all directions, till the edges of the convex region touch either an edge of the unified segment or an edge of the obstacle; and
identifying area covered by all the convex regions in the occupancy grid map as the free space.

5. The system as claimed in claim 4, wherein the plurality of unified segments represent free regions in the occupancy grid map.

6. The system as claimed in claim 4, wherein said system is configured to mark all other unified segments as virtual obstacles while expanding the convex region in a unified segment.

7. A non-transitory computer readable medium for free space detection for robotic path planning, comprising instructions, which when executed by one or more hardware processors causes the one or more hardware processors to perform a method comprising:
fetching, via the one or more hardware processors, sensor data pertaining to location of at least one obstacle in an area being scanned by a robot;
generating an occupancy grid map of the area based on the sensor data, via the one or more hardware processors, wherein the at least one obstacle is inscribed in a bounding box, in the occupancy grid map;
marking, via the one or more hardware processors, all unit geometric grids of the occupancy grid map which are fully or partially inscribed in the bounding box, as occupied;
seeding the occupancy grid map, via the one or more hardware processors, comprising:
generating a plurality of unified segments, wherein each of the plurality of unified segments is generated by merging the unit geometric grids which are out of the at least one bounding box;
identifying center of each of the plurality of unified segments; and
marking the identified center of each of the plurality of unified segments as a seed of the corresponding unified segment; and
identifying the free space by executing a convex expansion in the occupancy grid map, via the one or more hardware processors, comprising:
creating a convex region around each seed;
iteratively expanding the convex region within the corresponding unified segment, in all directions, till the edges of the convex region touch either an edge of the unified segment or an edge of the obstacle; and
identifying area covered by all the convex regions in the occupancy grid map as the free space.

8. The non-transitory computer readable medium as claimed in claim 7, wherein the plurality of unified segments represent free regions in the occupancy grid map.

9. The non-transitory computer readable medium as claimed in claim 7, wherein while expanding the convex region in a unified segment, other unified segments are marked as virtual obstacles.

* * * * *